United States Patent Office 2,714,090
Patented July 26, 1955

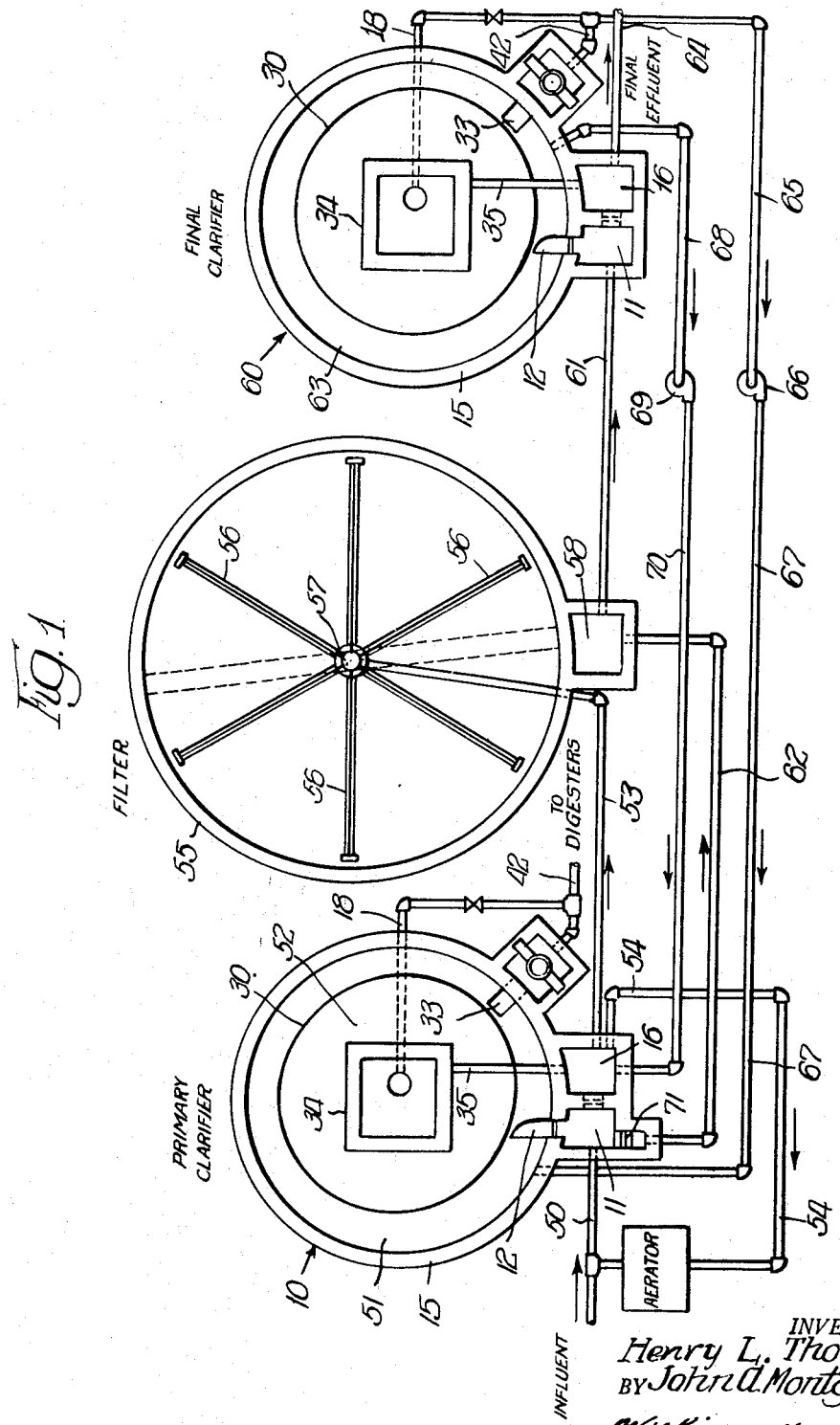

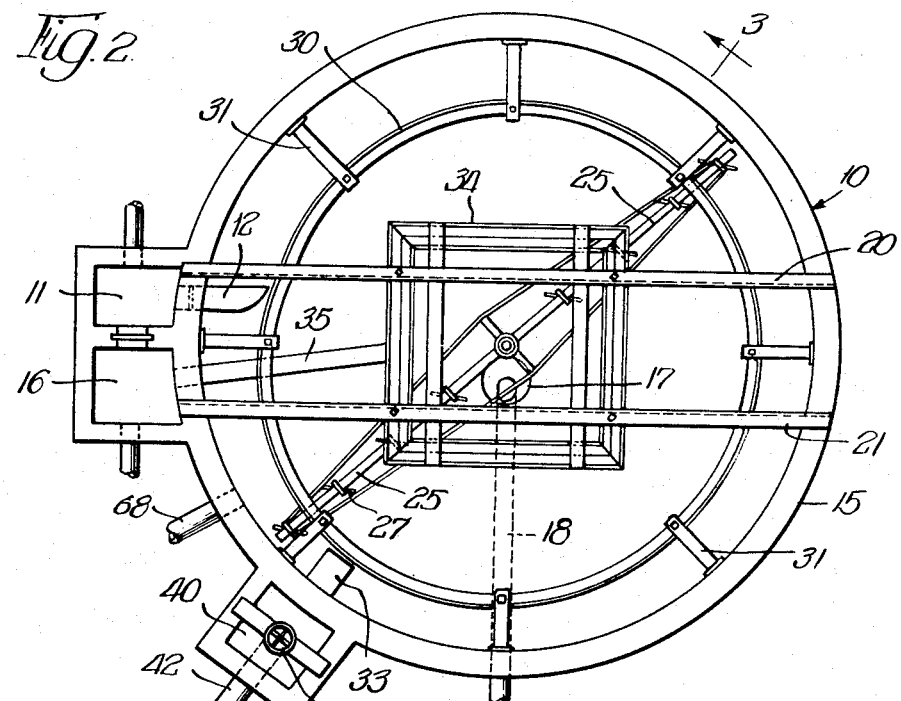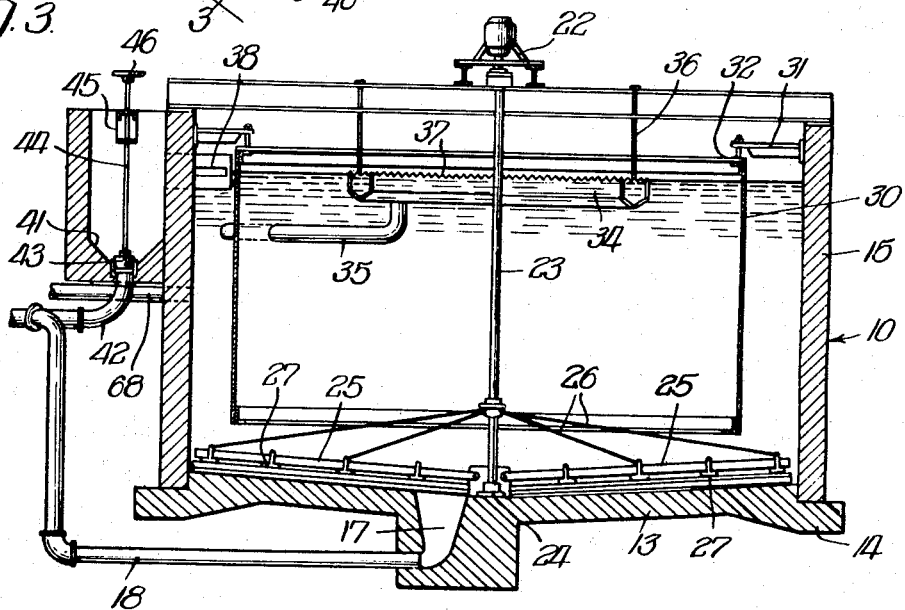

2,714,090

CLARIFICATION DEVICE

Henry L. Thompson, Portland, Oreg., and John A. Montgomery, Chicago, Ill., assignors to Lakeside Engineering Corporation, Chicago, Ill., a corporation of Illinois Original application February 13, 1951, Serial No. 210,742. Divided and this application May 27, 1952, Serial No. 290,126

3 Claims. (Cl. 210—3)

The invention relates to the disposal of sewage and industrial wastes and has reference more particularly to an improved method and apparatus for treating raw sewage for removing floatable and settleable solids therefrom and for obtaining a high degree of clarification as regards the effluent discharge from the final clarifying tank.

The purpose of the present invention is to provide an improved method of treating sewage and industrial wastes and which will efficiently treat the effluent from a trickling filter by subjecting the effluent to settling and clarification in an improved sedimentation tank with provision being made for recirculation of the tank liquor between the filter and the tank whereby the B. O. D. reductions are materially improved and other desirable advantages are secured, all of which can be obtained without a material increase in tank size.

Another object of the invention resides in the provision of a settling tank having improved constructional features wherein the incoming liquid to be treated is discharged tangentially in an annular race to facilitate flow around the race and spiraling movement in a downward direction toward the bottom of the tank. The depending skirt is positioned eccentrically within the circular tank so that the annular race is widest at the tangential inlet and progressively decreases in width from the tangential inlet to the scum outlet. As a result of this constructional feature the settling of the solids in the annular race is materially improved since of the solids are released from the liquid near the bottom of the tank at a minimum velocity, and further, the circular motion of the liquid in the annular race reduces the effect of any possible short circuiting beneath the skirt. In particular, the invention contemplates the provision of means for drawing off tank liquor from the annular race for recirculation purposes. A preferred location for the recirculation draw-off is between the scum outlet and the tangential inlet.

Another object is to provide an improved method for treating sewage and industrial wastes which will provide for by-passing excessive flows of liquid around the primary settling tank and the filter whereby settling of a portion of the raw unsettled liquid can take place before the total flow is discharged from the plant.

A still further object of the invention is to provide means for drawing off some of the effluent from the primary clarifier, thoroughly aerating the same, and then returning the aerating effluent to the primary clarifier for admixture with the incoming raw liquid whereby to assist in the oxidation of certain inorganic compounds, the conversion of colloidal grease to flowing grease, and in the purification of the raw liquid by treatment through bio-chemical agencies in the presence of an adequate supply of dissolved oxygen.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a view illustrating sewage treating equipment including an arrangement of a filter and clarifiers coming within the invention;

Figure 2 is a plan elevational view of the improved clarifying tank of the invention; and Figure 3 is a vertical sectional view taken substantially along line 3—3 of Figure 2.

Referring to the drawings, and more particularly to Figures 2 and 3, which disclose a preferred form of clarifier indicated by numeral 10, the incoming liquid to be treated is delivered to an influent well 11 which delivers to an influent deflector 12. The circular tank or settling basin is formed of concrete having a conical bottom 13 and base supporting portions 14. The circular walls 15 extend upwardly from the base portions and said walls support the super-structure and other equipment of the tank including the influent well 11 and the effluent well 16. The conical bottom 13 of the tank is provided with a sludge basin 17 located approximately centrally and which connects with the sludge draw-off 18.

The super-structure supported by tank 10 includes the diametrically extending beams 20 and 21 which provide a walk across the top of the tank should such structure be desired, although it is not shown in the present drawings. The said beams provide the necessary support for the motor and reducing mechanism indicated by numeral 22, the same being supported centrally of the tank and providing the drive shaft 23 which depends downwardly to terminate adjacent the bottom 13 of the tank, said terminal end being positioned and journalled by the cup-shaped member 24. Two oppositely extending inclined scraper arms 25 are suitably supported from the lower end of shaft 23 and each arm is suitably braced by means of the tie rods 26. A plurality of flat sheet metal plows 27 are secured in proper spaced relation to the scraper arms 25 by means of suitable clamps and it will be observed that the plows are set at an angle with respect to the direction of rotation of the scraper arms so as to scrape the sludge from the bottom of the tank and propel the same to the sludge basin 17.

The interior of the present settling tank is divided into two compartments by means of the depending skirt 30. The radially extending supports 31 are suitably secured to wall 15 by means of anchor bolts, not shown, and the depending skirt is suitably secured to the supports by means of threaded rods 32. In accordance with the invention the depending skirt is eccentric as regards the circular wall 15, the same being eccentrically located in order to form an annular race which will progressively decrease in width from the influent deflector 12 to the scum outlet which is indicated by the pipe 33. The eccentric positioning of the skirt is shown in Figure 2 and is further illustrated as regards the clarifiers shown in Figure 1. Whereas, the depending skirt forms an annular race with the circular wall of the tank, the interior of the tank provides a clarifying chamber and in order to reach said clarifying chamber it is necessary for the liquid in the annular race to flow downwardly, to pass under the terminal end of the depending skirt, which is suitably spaced from the bottom wall 13 of the tank, and to then flow upwardly in the clarifying chamber. Decanting of the clear liquid reaching the top of the clarifying chamber is effected by the launder 34 which may be circular, hexagonal or square, with the latter shape being shown, and with adequate weir surface being provided. The clear liquid withdrawn from the tank by the launder is discharged through the effluent pipe 35 connecting therewith and which pipe passes through the depending skirt into the annular race and through the wall 15 of the tank to discharge into the effluent well 16. The launder may be suitably supported from the beams 20 and 21 by hangers 36 so that the launder will be located at the level desired for the liquid in the tank and which flows over the weirs 37 in the form of notches along the top edge of the launder and on both sides of the same so that the total length of the serrated edge is approximately equal to the circumferential length of the bottom edge of the depending skirt.

One or more scum outlets may be provided such as the pipe 33 which is slotted as at 38 in substantial alignment with the water level so as to drain the scum and other floatable solids from the annular race into the scum pipe which delivers the same to a receiving well 40. The scum well is preferably formed of concrete in all respects similar to the influent and effluent wells with the exception that the bottom of well 40 is sloped as at 41 leading to the scum outlet having connection with pipe 42. It is possible to close the scum outlet by means of valve 43 having the stem 44 attached thereto and which stem is suitably supported and journalled by cross member 45. The handle 46 is fixed to the projecting end of the stem to facilitate manual actuation of the scum valve.

Referring to Figure 1, the settling tank of the invention is employed as a primary clarifier and also as a final clarifier in combination with a trickling filter. The raw sewage or other liquid to be treated is supplied by pipe 50 to the influent well of the primary clarifier indicated in its entirety by numeral 10, the same having an annular settling chamber 51 formed by the skirt 30 and a central clarifying chamber 52 within the depending skirt. The launder 34 decants the clear liquid, it is conducted by pipe 35 to the effluent well, having connection with pipes 53 and 54. The sludge pipe 18 of the primary clarifier tank has connection with the scum pipe 42 which delivers the solids from the primary clarifier to the digesters of the sewage treatment plant. As explained in connection with Figures 2 and 3, the incoming raw liquid is discharged tangentially into the annular race 51 by means of the influent deflector 12 of the primary clarifier. The liquid is thereby caused to travel around the annular race and said spiralling movement takes place together with gradual movement in a downward direction toward the bottom of the tank. The action facilitates the settling of the settleable solids and the flotation of the scum and other solids which float on the surface of the liquid in the annular race so that they are eventually drawn off by the scum outlet pipe 33. The liquid within the clarifying chamber flows upwardly through the launder 34 and here again the flow is conducive to thorough clarification of the liquid so that relatively clear liquid is decanted from the tank through the effluent pipe 35.

Most of the clear liquid from the primary clarifier is delivered by pipe 53 to a trickling filter indicated in its entirety by numeral 55 and which is conventional in construction, the same consisting of a circular tank containing a bed of stone or the like which extends for the full depth of the filter and provides the well known filter bed over which the effluent from the primary clarifier is discharged through a plurality of outlets provided in the arms 56 which project radially outward from the center supporting and rotating post 57. The filter bed is continuously supplied with liquid which maintains the bed biologically active in the well known manner to effect B. O. D. reductions in the liquid delivered to the same. The discharge from the trickling filter is suitably drawn off and delivered to the effluent well 58 having the pipes 61 and 62 connected therewith. Pipe 61 delivers the filter discharge to the influent well of a final clarifier generally designated by numeral 60 and which is better illustrated in detail in Figures 2 and 3.

The clarified and treated liquid is discharged tangentially by the influent deflector 12 into an annular race 63 formed by the eccentrically positioned depending skirt 30. The action of the final clarifier is similar to that of the primary clarifier since the tangentially discharged liquid is caused to travel around the race and to also flow in a downward direction toward the bottom of the tank. The spiralling action facilitates the settling of the settleable solids and the flotation of the scum and other light solids which are drawn off by the scum outlet 33. The clarified liquid decanted by the launder 34 is delivered to the effluent well which discharges the same from the plant by means of the connecting pipe 64. The sludge draw-off pipe 18 of the final clarifier suitably connects with the scum pipe in a manner as described for the primary clarifier and both pipes deliver to the secondary sludge return pipe 65. The said pipe 65 is provided with a pump 66 suitably operated by means not shown and which delivers the secondary sludge to pipe 67, the same leading to the primary clarifier and having connection therewith so as to discharge the secondary sludge into the annular race adjacent the influent deflector 12.

The final clarifier is provided with means for drawing off tank liquor and more particularly with a recirculation pipe 68, Figure 3, which passes through wall 15 of the clarifier into the annular race whereby liquid from the annular race is drawn off for recirculation purposes. A preferred location for the recirculation draw-off pipe 68 is between the influent deflector 12 and the scum outlet 33 and the open mouth of the pipe 68 should be positioned several feet below the liquid level in the annular race but not deeper than approximately one-half of the height of the depending skirt. By thus locating the recirculation pipe below the liquid level in the race and beyond the scum outlet but in advance of the inlet conduit, considering the direction of flow, the said pipe can withdraw the most desirable tank liquor for recirculation purposes. Said tank liquor is partially clarified, containing some solids of small size and is therefore biologically active. However, the recirculation pipe is so located that no scum is withdrawn and neither does the pipe withdraw any of the undesirable heavy sludge particles. It has been calculated that the liquid will travel around the annular race approximately once, and which is three times the diameter of the tank before reaching the suction of the recirculation pipe 68, when located as herein stated. Accordingly, the heavy solids are dropped from the liquid before the liquid is drawn off for recirculation. Also when recirculation is practiced from the race, the only increase in clarifier size required for parallel recirculation is to take care of the increased flow through the race. Thus, for a two to one recirculation, the clarifier would not be sized for a three M. G. D. based on one M. G. D. of raw sewage but its area would be increased only about seventeen per cent or from thirty-eight feet to forty-one feet in diameter. Also when liquid is taken from the annular race for recirculation purposes a relatively short detention time in the final clarifier is assured. Pipe 68 connects with pump 69 which is suitably driven to deliver the liquid to pipe 70, the same having connection with the effluent well of the primary clarifier. In this way the liquid to be recirculated is delivered in advance of the filter so as to augment liquid being delivered to the filter. Continuous flow of clarifier effluent and recirculating tank liquor is desirable and it is further desirable that the liquid flow be at a relatively high rate to insure uniform action throughout the entire filter bed depth and the elimination of ponding of the filter bed which makes possible desirable growth and the desired action of the biological organisms in the filter bed.

Pipe 62 leading from the influent well 11 of the primary clarifier connects with the effluent well 58 of the trickling filter, there being located a weir 71 in the influent well of the primary clarifier vertically positioned with respect to the incoming flow of raw sewage so that excessive flows will be by-passed around the primary clarifier and around the trickling filter. It will be seen that pipe 62 will conduct the excessive flow of liquid directly to the effluent well 58 of the trickling filter where the same is delivered by pipe 61 to the final clarifier. This method of by-passing excessive flows of raw sewage provides for settling of the raw unsettled sewage in the final clarifier before the total flow is discharged from the plant.

Referring again to pipe 54, which has connection with the effluent well of the primary clarifier, it will be observed that the pipe connects with an aerator which in turn has connection with the influent pipe 50. In accordance with the invention a portion of the clarified liquid from the primary clarifier is drawn off and the liquid so drawn off is thoroughly aerated, the aeration being continued until the liquid has a milky consistency. The thoroughly aerated liquid is then delivered to the influent in pipe 50 which delivers the incoming liquid to the primary clarifier. The effect is to increase the dissolved oxygen content of the incoming sewage so as to assist in the oxidation of certain organic compounds, the conversion of colloidal grease to floating grease, and generally in the purification of the raw liquid by treatment through biochemical agencies in the presence of an adequate supply of oxygen.

This application is a divisional of my copending application Serial No. 210,742, filed February 13, 1951, and entitled Sewage Disposal System with Aeration and Recirculation.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a settling device, in combination, a circular tank having a vertical cylindrical wall and an approximately horizontal bottom wall, a substantially cylindrical skirt depending within the tank in spaced relation to the vertical and bottom walls of the tank, said skirt dividing the tank into an annular race extending around the skirt and into a centrally disposed clarifying chamber within the skirt, an inlet conduit supplying incoming liquid to the annular race in a tangential manner to cause flow of the liquid around the race in addition to normal downward flow, a launder positioned within the clarifying chamber for withdrawing clarified liquid, a scum outlet located in the annular race and angularly spaced from the tangential inlet at least 180 degrees in the direction of liquid flow, a recirculation pipe extending through the vertical wall of the tank and into the annular race for drawing off some of the liquid from the race for recirculation purposes, said depending skirt being eccentrically positioned with respect to the vertical wall of the tank in a manner to provide an annular race of progressively decreasing width from the inlet conduit to approximately the scum outlet, and said recirculation pipe being located in the vicinity of the scum outlet and below the liquid level in the race but not deeper than approximately half the height of the depending skirt.

2. In a settling device, in combination, a substantially circular tank having a vertical cylindrical wall and an approximately horizontal bottom wall, a substantially cylindrical skirt depending within the tank in spaced relation to the vertical and bottom walls thereof and said skirt being disposed eccentrically with respect to the vertical wall, said skirt dividing the tank into an annular race extending around the skirt and into a centrally disposed clarifying chamber within the skirt, an inlet conduit supplying incoming liquid to the annular race in a tangential manner to cause flow of the liquid around the race in addition to normal downward flow, a scum outlet located in the annular race and angularly spaced from the inlet conduit at least 180 degrees in the direction of liquid flow, the eccentric relation of the depending skirt providing an annular race having its maximum width at the inlet conduit and its minimum width in the vicinity of the scum outlet whereby said race progressively decreases in width from inlet to scum outlet in the direction of liquid flow, a launder positioned within the clarifying chamber for withdrawing clarified liquid, and a recirculation pipe extending through the vertical wall of the tank and into the annular race for drawing off some of the liquid from the race for recirculation purposes, said recirculation pipe being positioned beyond the scum outlet but in advance of the inlet conduit as regards direction of flow in the race, and being located below the liquid level in the race but not deeper than approximately half of the height of the depending skirt.

3. In a settling device, in combination, a substantially circular tank having cylindrical walls and a bottom wall of conical shape with conduit means provided thereby for withdrawing material from the lowest point of the bottom wall, a substantially cylindrical skirt depending within the tank in spaced relation to the vertical and bottom walls thereof, said skirt dividing the tank into an annular race extending around the skirt and into a centrally disposed clarifying chamber within the skirt, an inlet conduit supplying incoming liquid to the annular race in a tangential manner to cause flow of the liquid around the race in addition to normal downward flow, a scum outlet located in the annular race and angularly spaced from the inlet conduit at least 180 degrees in the direction of liquid flow, a launder positioned within the clarifying chamber for withdrawing clarified liquid, a recirculation pipe extending through the cylindrical wall of the tank and into the annular race for drawing off some of the liquid from the race for recirculation purposes, said recirculation pipe being located in the annular race beyond the scum outlet but in advance of the inlet conduit considering the direction of liquid flow, and means including scraper arms provided with rakes for moving material deposited on the conical bottom toward the said conduit means, said scraper arms extending under both the clarifying chamber and the annular race.

References Cited in the file of this patent
UNITED STATES PATENTS
2,418,950   Montgomery _____ Apr. 15, 1947